April 3, 1962 H. R. BRAND ETAL 3,028,326
NUCLEAR FUEL ELEMENT AND METHOD OF MANUFACTURE
Filed Jan. 9, 1959 3 Sheets-Sheet 1
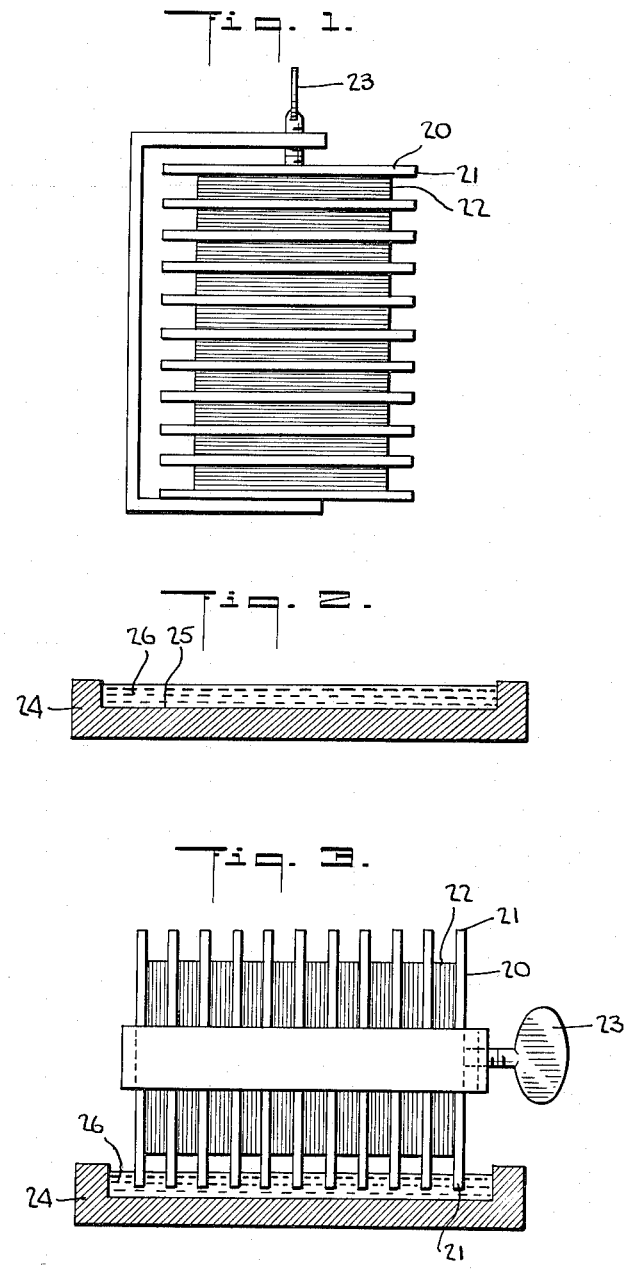
INVENTORS
HARRY R. BRAND
ELI I. SCHEFER
BY
Kenyon & Kenyon
ATTORNEYS

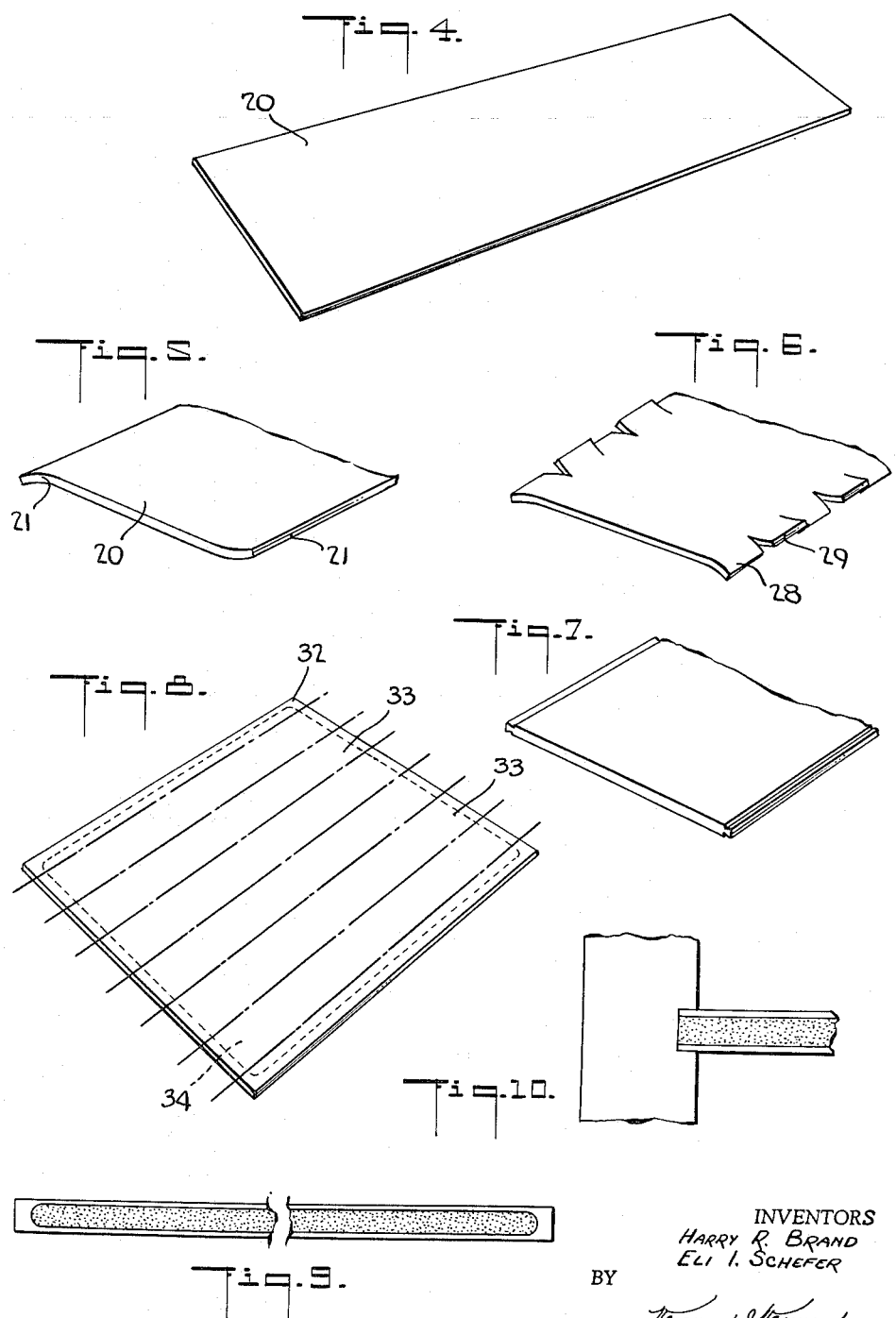

April 3, 1962 H. R. BRAND ETAL 3,028,326
NUCLEAR FUEL ELEMENT AND METHOD OF MANUFACTURE
Filed Jan. 9, 1959 3 Sheets-Sheet 3
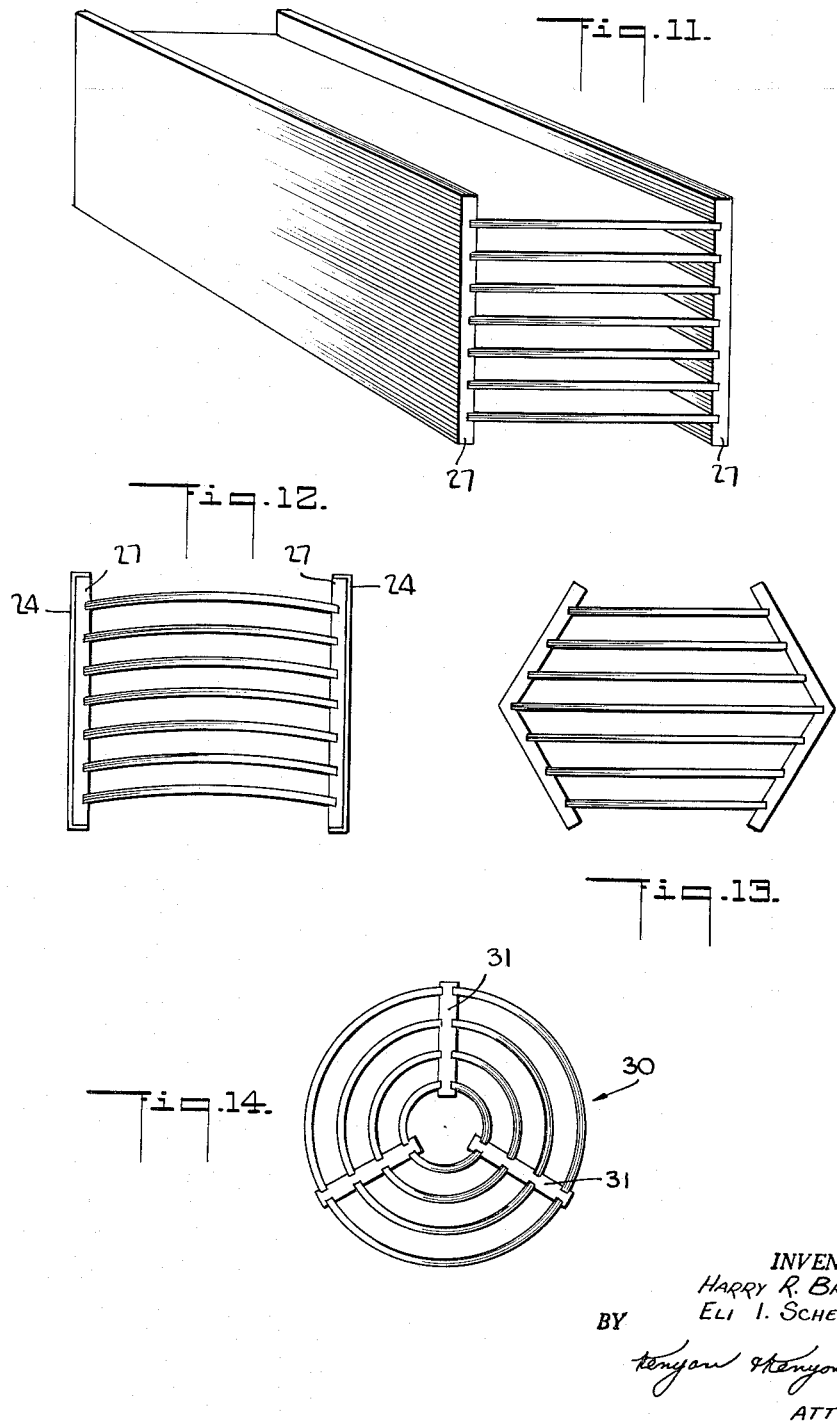
INVENTORS
HARRY R. BRAND
ELI I. SCHEFER
BY
ATTORNEYS United States Patent Office 3,028,326
Patented Apr. 3, 1962

3,028,326
NUCLEAR FUEL ELEMENT AND METHOD
OF MANUFACTURE
Harry R. Brand, Hicksville, and Eli I. Schefer, Plainview,
N.Y., assignors, by mesne assignments, to Sylvania
Electric Products Inc., a corporation of Delaware
Filed Jan. 9, 1959, Ser. No. 785,874
8 Claims. (Cl. 204—154.2)

This invention relates to a plate type nuclear reactor fuel assembly, and a novel method of constructing the same.

Nuclear reactors generally contain a number of fuel assemblies which are made separately and then mounted in a group within the reactor for use. Such fuel assemblies may be of the plate type, consisting of individual fuel plates held in a spaced overlying relationship relative to one another by supporting members at their edges. The spaces between the fuel plates serve as passageways for a cooling or heat transfer fluid such as water. The fuel plates are usually made of protective material, for example aluminum, which surrounds an inner layer of fissionable material such as uranium. The fuel plates may be flat or curved and of any shape, but in general they are long, narrow and thin and of rectangular configuration.

There have been many problems in the manufacture of plate type nuclear fuel assemblies. Fuel plates have been attached to the side supporting members by brazing, an operation which is not only time consuming and expensive, but one which is susceptible of producing uncontrollable gaps and voids in the weld. Such voids may entrap flux materials such as lithium and the like which in some forms act as neutron absorbers and consequently the operability of the fuel plate in the assembly may be thereby impaired or even destroyed.

Furthermore, the relatively expensive fuel plates are often warped by the heat of the brazing operation, and at the same time the kind of joining effected by the brazing makes salvage of the undamaged elements from a faulty assembly difficult if not impossible.

Other methods of joining the fuel plates to the side supporting members include a swaging operation, the use of various types of mortise and tenon joints, riveting, and the like. With such prior methods relatively complex assembly tooling is required, substantially close tolerances must be adhered to on all components of the assembly, stresses are frequently set up in the assembly by the fabrication procedure, and in addition, some of the above procedures result in weakening the side supporting members.

From an economic standpoint the prior methods have several undesirable features such as the costly steps of alloying, punching, welding, heating, rolling, fluoroscoping, shearing and the like, all of which constitute significant elements in the overall cost of manufacture of the fuel assembly.

It is an object of this invention to provide a method for fabricating a plate type nuclear reactor fuel assembly whereby tooling is greatly simplified, tolerances can be relaxed and greater strength and rigidity of the fuel assembly is obtained in comparison with those of prior processes.

Another object is to provide a simplified method of fabricating such an assembly which eliminates the need of machining the side plates, does not add stresses to the structure, and makes feasible the use of complicated structural forms heretofore found impractical or impossible.

A further object is to provide an assembly method having significantly increased economies.

Briefly, the principles of the present invention are directed to a method of assembling a plurality of fuel plates in a nuclear reactor fuel assembly comprising the steps of deforming the side edges of the plates, e.g. providing knurled, serrated, crimped, or notched, etc., edges, then stacking the plates in a spaced overlying relation to one another with spacing members between adjacent plates and with the deformed respective side edges of the plates aligned relative to one another.

The stack of plates is then temporarily clamped together as a group. A flat generally rectangular horizontal mold cavity is provided and filled with an epoxy resin material to a desired depth corresponding to the required thickness of the side supporting member. The group of clamped plates is held in a generally vertical position over the cavity and one set of side edges of said group is immersed in the fluid epoxy resin material. The group of plates is maintained in such immersed position while the epoxy resin material is cured and thus hardens to provide a side supporting member for such side edges.

The casting operation is repeated to provide a similar side supporting member for the opposed set of side edges and then the clamp and spacing members are removed, leaving the desired fuel assembly having cast side supporting members rigidly bonded to the fuel plates.

A further feature of the invention resides in a method of manufacturing the fuel plates which comprises mixing together prescribed quantities of epoxy resin, fissionable material and a thermal conductivity enhancing constituent, e.g. aluminum powder, and casting such mixture into the desired plate form and curing the casting. The cured plate is then optionally sprayed on both sides with resin and again cured, and is then ready for use in the above described assembly process.

Other objects and features of the invention will become apparent in the following specification and claims, and in the drawings in which:

FIG. 1 is a side elevation of a stack of plates clamped together as a group.

FIG. 2 is a longitudinal section of a molding cavity containing the casting material.

FIG. 3 is a partially sectioned side elevation of the stack of plates with one set of side edges of the plates immersed in the casting material.

FIG. 4 is an isometric view of a typical fuel plate.

FIG. 5 is a fragmentary isometric view of a fuel plate having its side edges curved to provide lips.

FIG. 6 is a fragmentary isometric view of a plate showing another form of deformation of the side edges.

FIG. 7 is a fragmentary isometric view of a fuel plate having a dove-tailed configuration along its side edges.

FIG. 8 is a diagrammatic view of a method for making a plurality of fuel plates from a master fuel plate.

FIG. 9 is an enlarged fragmentary longitudinal section of a fuel plate cut from the master fuel plate of FIG. 8.

FIG. 10 is an enlarged fragmentary sectionalized end elevation showing the interconnection of a side edge of a fuel plate with the side supporting member.

FIG. 11 is a perspective view of a conventional plate type nuclear reactor fuel assembly.

FIG. 12 is an end elevation of a curved plate fuel assembly.

FIG. 13 is an end elevation of a hexagonal fuel assembly.

FIG. 14 is an end elevation of a cylindrical fuel assembly.

Referring now to the drawings, FIGS. 1 through 3 inclusive show the successive steps of one embodiment of the method of the present invention in schematic form. Conventional fuel plates 20 (see also FIG. 4) having an inner layer of fissionable material such as uranium encased in a protective layer of aluminum or the like, are stacked in spaced overlying relation to one another with the respective side edges 21 of the plates aligned relative to one another as shown in FIG. 1, and with spacing members 22 of any suitable material such as wood or the like disposed between adjacent plates to maintain the plates at the proper distance from one another. The stack of plates and spacing members are held together as a group by screw clamp 23.

A horizontal molding cavity 24 is provided, being flat and having a generally rectangular configuration. The molding recess 25 is relatively shallow and may be only slightly greater in depth than the thickness of the side supporting member desired to be cast. The recess 25 is filled to the desired depth with the casting material 26 which may be one of a variety of thermosetting resins or the like, such as an epoxy resin, and may also include a filler such as aluminum powder which not only adds strength to the resin when hardened but also substantially increases and enhances the thermal conductivity of the side supporting member when cast.

Then the clamped group of plates is positioned over the molding cavity with the plates in a generally vertical position as shown in FIG. 3, so that one set of side edges 21 is immersed in the casting material to the extent desired in the finished assembly. The plates are maintained in the latter position by suitable means (not shown) while the casting material is cured or hardened in the conventional manner. Upon hardening of the material a side supporting member is formed in the shape of the recess 25 and is permanently bonded to the edges of the plates.

The casting portion is then repeated in a similar fashion for the other set of opposed side edges to provide a side supporting member 27 for them and to produce a complete fuel assembly unit as shown in FIG. 11. After molding the side supporting members 27 in situ according to the above steps, the molding cavities, the clamp and spacers are then removed and the fuel assembly is ready for use.

The above method adapts itself for use with various other types of casting materials, even molten metals such as aluminum or the like.

It may be found preferable prior to the stacking of the plates in the first part of the method to deform the side edges 21 of the plates 20 in some fashion to increase or tend to increase the structural bonding of the plates 20 to the side supporting members 27. For example, as shown in FIG. 5 the side edges 21 can be curved to provide upwardly or downwardly curved lips along such edges. As shown in FIG. 6, the side edges 21 may be laterally cut at longitudinally spaced intervals and the sections 28 thereby provided may be shaped into alternate upwardly and downwardly curved lip portions 29. FIG. 7 shows still another shape which may be given to the side edges 21, namely, a dove-tailed configuration. These and other shapes may be used such as, for example, a knurled surface (not shown).

With the method of the present invention practically any desired shape of fuel assembly can be made such as the curved plate assembly shown in FIG. 12, the hexagonal assembly in FIG. 13, or the cylindrical fuel assembly shown in FIG. 14. In the case of the cylindrical fuel assembly, each set of curved segments 30 can be provided with in situ molded side supporting members 31 and then the three sets of segments formed into the cylindrical fuel assembly by appropriately bonding the adjacent side supporting members 31 together by any suitable means, or a suitable mold or set of molds can be provided to cast the three side supporting members in situ simultaneously.

Since by the use of the epoxy resin or other suitable plastic-like material, it is unnecessary to have the side edges of the fuel plate provided with a protective outer coating over the edge of the inner layer of fissionable material, the method is particularly adaptable for a more economic method of fabricating the fuel plates.

Thus a master fuel plate 32 may be fabricated by any well-known method and the master plate cut into a plurality of smaller fuel plates 33 (see FIG. 8). In the embodiment shown a flat generally rectangular master fuel plate 32 is provided having an enclosed center layer of fissionable material 34 (see FIG. 9) and the smaller elongated fuel plates 33 have closed ends 35 but open side edges 36 exposing the center layer of fissionable material 34 therealong. Because of the lack of mechanical deformation of the side edges 36 during the molding of the side supporting member 37 to the plate 33, it is not necessary to have enclosed side edges on the fuel plates. Consequently the fuel plates can be made on a large scale basis in the latter fashion and further cost savings achieved.

The present invention also affords another new and novel manner of manufacturing fuel plates. Instead of having the usual aluminum clad fuel plates with the encased fissionable material therein, fuel plates can be made from an epoxy resin containing a dispersed fissionable material therein. Such fuel plates are molded in the same general manner described above for the manufacture of side supporting members.

First, the fissionable material, e.g. uranium or the like, is mixed with, for example, an epoxy resin and optionally aluminum powder and then cast into a flat elongated plate in a suitably dimensioned casting mold and then permitted to harden. Then the plate is removed from the mold and may be sprayed with resin on both sides and cured. The plates thus formed are extremely durable and may be dropped or even hammered without breakage.

Generally the filler, i.e. the mixture of the uranium plus the aluminum powder, runs between about 50 up to about 85% by volume of the cast fuel plate and in such range contains from about 5 to 29% by volume of fissionable material, the balance being the aluminum. The remaining 15% of the total volume of the fuel plate is the epoxy resin.

Thus it is now possible to manufacture fuel plates without applying heat during a rolling heat up or annealing, without having to roll a plate down to size from a larger picture frame sandwich, and without the necessity of machining the components, such as the core, the picture frame, etc. Most of the expensive fabricating equipment required by prior art methods is now unnecessary and tremendous economies are thereby provided.

The products and methods of the present invention are particularly adapted to the manufacture of fuel assemblies for the swimming pool type reactor. It is, of course, apparent that fuel assemblies can be made according to the methods herein for any type of nuclear reactor with the proper choice of materials.

While certain embodiments of the invention have been shown and described herein it is to be understood that certain changes and additions can be made by those skilled in the art without departing from the scope and spirit of the present invention. For example, it may be desirable to construct the molding cavities out of relatively thin aluminum or other suitable metal and to carry out the molding method in such a way that the metal molding cavities remain in place on the finished fuel assembly and constitute part of the side supporting member in conjunction with the casting material filling the cavity, as shown in FIG. 12. Furthermore, various types of molding cavities can be employed for the present process and they may be either opened or closed and in addition may be oriented in any appropriate position. These and other variations are contemplated as being within the scope of the invention.

We claim:

1. A method of assembling a plurality of fuel plates in a nuclear reactor fuel assembly comprising the steps of curving selected edges of said plates, arranging said plates in a desired spaced orientation and temporarily interconnecting said plates as a group with edges of respective selected edges aligned relative to one another, and molding a side supporting member in situ along each group of aligned side edges and thereafter removing the temporary interconnection between said plates.

2. A method of assembling a plurality of fuel plates in a nuclear reactor fuel assembly comprising the steps of curving the side edges of said plates, arranging said plates in a desired spaced orientation and temporarily interconnecting said plates as a group with edges of respective selected edges aligned relative to one another, and molding a side supporting member in situ along each group of aligned side edges and thereafter removing the temporary interconnection between said plates.

3. A method of assembling a plurality of fuel plates in a nuclear reactor fuel assembly comprising the steps of providing a dove-tail configuration along the side edges of said plates, arranging said plates in a desired spaced orientation and temporarily interconnecting said plates as a group with edges of respective selected edges aligned relative to one another, and molding a side supporting member in situ along each group of aligned side edges and thereafter removing the temporary interconnection between said plates.

4. A method of assembling a plurality of fuel plates in a nuclear reactor fuel assembly comprising the steps of providing a plurality of alternate oppositely curved longitudinal lip sections along the side edges of said plates, arranging said plates in a desired spaced orientation and temporarily interconnecting said plates as a group with edges of respective selected edges aligned relative to one another, and molding a side supporting member in situ along each group of aligned edges and thereafter removing the temporary interconnection between said plates.

5. A method of assembling a plurality of fuel plates in a nuclear reactor fuel assembly comprising the steps of providing a plurality of alternate oppositely curved longitudinal lip sections along the side edges of said plates, stacking said plates in spaced overlying relation to one another with spacing members in between adjacent plates, clamping said plates and spacing members in such relation with edges of respective selected edges aligned relative to one another, and molding a side supporting member in situ along each group of aligned edges and thereafter removing said spacing members.

6. A method of assembling a plurality of fuel plates in a nuclear reactor fuel assembly comprising the steps of deforming the side edges of said plates, stacking said plates in a spaced overlying relation to one another and with the deformed respective side edges of said plates aligned relative to one another, temporarily clamping said plates together as a group, providing a flat generally rectangular horizontal mold cavity, filling said cavity with an epoxy resin material to a desired depth, immersing one set of side edges of said group in said material with said edges in a generally vertical position, maintaining said group in such immersed position while said material hardens to provide a side supporting member for said side edges and repeating the casting operation to provide a side supporting member for the opposed set of side edges, and thereafter removing the stacked spacing members.

7. A method of assembling a plurality of fuel plates in a nuclear reactor fuel assembly comprising the steps of deforming the side edges of said plates, stacking said plates in a spaced overlying relation to one another with spacing members between adjacent plates and with the deformed respective side edges of said plates aligned relative to one another, temporarily clamping said plates together as a group, providing a flat generally rectangular horizontal mold cavity, filling said cavity with an epoxy resin material to a desired depth, immersing one set of side edges of said group in said material with said edges in a generally vertical position, maintaining said group in such immersed position while said material is hardened to provide a side supporting member for said side edges and repeating the casting operation to provide a side supporting member for the opposed set of side edges, and thereafter removing said spacing members.

8. A method of assembling a plurality of fuel plates in a nuclear reactor fuel assembly comprising the steps of deforming the side edges of said plates, stacking said plates in a spaced overlying relation to one another with spacing members between adjacent plates and with the deformed respective side edges of said plates aligned relative to one another, temporarily clamping said plates together as a group, providing a flat generally rectangular horizontal mold cavity, filling said cavity with an epoxy resin material to a desired depth, immersing one set of side edges of said group in said material with said edges in a generally vertical position, maintaining said group in such immersed position while said material hardens to provide a side supporting member for said side edges and repeating the casting operation to provide a side supporting member for the opposed set of side edges, and thereafter removing said spacing members and said mold cavities.

References Cited in the file of this patent

UNITED STATES PATENTS

| | | |
|---|---|---|
| 2,121,597 | Karl | June 21, 1938 |
| 2,303,416 | Woods | Dec. 1, 1942 |
| 2,493,414 | Morrison | Jan. 3, 1950 |
| 2,763,032 | Fay | Sept. 18, 1956 |
| 2,771,156 | Kasten et al. | Nov. 20, 1956 |
| 2,855,372 | Jenkins et al. | Oct. 7, 1958 |

OTHER REFERENCES (I) International Conference on Peaceful Uses of Atomic Energy, vol. 9, 1955, pp. 203–207.

(II) International Conference on Peaceful Uses of Atomic Energy, vol. 5, 1955, pp. 212–213.

APEX–277, August 1956, available from OTS, Dept. of Comm., Washington 25, D.C., price 20 cents.

Modern Plastics, vol. 34, October 1956, pp. 148–151, 284.

Missiles and Rockets, vol. 3, No. 3, March 1958, pp. 69–75.